United States Patent [19]

Heinrici et al.

[11] Patent Number: 5,265,763

[45] Date of Patent: Nov. 30, 1993

[54] DOSING DEVICE FOR BULK MATERIAL INCLUDING LIQUIDS

[75] Inventors: Harald Heinrici, Biebesheim; Uwe Bachmann, Seeheim-Jugenheim; Ludger Toerner, Eppertshausen, all of Fed. Rep. of Germany

[73] Assignee: Carl Schenck AG, Darmstadt, Fed. Rep. of Germany

[21] Appl. No.: 883,142

[22] Filed: May 13, 1992

[30] Foreign Application Priority Data

May 17, 1991 [DE] Fed. Rep. of Germany ....... 4116331

[51] Int. Cl.$^5$ ............................................. G01G 13/00
[52] U.S. Cl. ..................... 222/77; 177/199; 222/185; 222/413
[58] Field of Search .................. 222/55, 77, 181, 185, 222/412, 413, 533; 177/244, 199

[56] References Cited

U.S. PATENT DOCUMENTS

| | | | |
|---|---|---|---|
| 3,135,432 | 6/1964 | McKinney | 222/185 |
| 3,412,903 | 11/1968 | van Riper, Jr. et al. | 222/326 X |
| 4,111,272 | 9/1978 | Ricciardi et al. | 177/50 |
| 4,722,456 | 2/1988 | Laidlaw et al. | 222/77 X |

FOREIGN PATENT DOCUMENTS

| | | |
|---|---|---|
| 0207303 | 1/1987 | European Pat. Off. . |
| 2635314 | 2/1990 | France . |
| 7904025 | 11/1989 | Netherlands .......................... 222/77 |
| 386138 | 4/1965 | Switzerland . |

OTHER PUBLICATIONS

Article Entitled: "Auf die richtige Dosis", p. 112; handling berichtet, Sep. 1990, handling Nr. 206.
Article Entitled "Entwicklungslinien der Schuettgut-dosiertechnik*", by Gerhard Vetter & Hubert Wolfschaffner; Chem.-Ing. Tech. 62 (1990) Nr. 9, pp. 695–706 (Uebersichtsbeitraege 1990).
Article Entitled: "Abfuellen, Dosieren, Mischen nach Gewicht" by H. Weinberg; May, 1984; Verpackung in der Chemie, Beihefter Maurer Kennziffer CP32.

*Primary Examiner*—Andres Kashnikow
*Assistant Examiner*—J. A. Kaufman
*Attorney, Agent, or Firm*—W. G. Fasse

[57] ABSTRACT

A bulk material dosing or feeder device has at least one upright post mounted to a base and carrying a horizontal head section. A supply hopper is supported by the head section. Modular units such as a stirrer, a weigher or feeder or the like are vertically aligned, vertically below the hopper. At least one, preferably each modular unit is mounted on a respective swivel arm. The swivel arm is journalled to the upright post whereby the modular unit may be tilted into an operative position below the hopper or into an out position for easy access to and exchange of the modular units.

12 Claims, 2 Drawing Sheets

DOSING DEVICE FOR BULK MATERIAL INCLUDING LIQUIDS

FIELD OF THE INVENTION

The invention relates to a dosing device for bulk material such as granular and fibrous material and including liquids. Such dosing devices normally include a supply container, dosing elements such as a differential scale, and feed advance components supported in a frame structure.

BACKGROUND INFORMATION

Dosing devices and material feed mechanisms used in many areas of industrial production to supply measured quantities of bulk materials to their further use. These bulk materials have most varied characteristics. Thus, it happens frequently that in a manufacturing sequence different bulk materials are used at different times. Such different bulk materials may, for example, have different grain sizes or may include components at differing mixing ratios or the like. Also materials calling for different pretreatments may be involved. As a result, such production sequences usually require at least that the dosing mechanisms must be cleaned when a change over from one material to another material takes place. Further, it may become necessary to exchange components of the dosing device or to add or remove components for a particular purpose.

The trade publication "Handling", September 1990, page 112, describes a dosing apparatus of the type here involved. Such a dosing apparatus functions as a modular differential dosing scale, including a supply container with a vertical stirring mechanism and with a tiltable worm feeder. These components are supported by load cells forming the measuring components of the scale. These load cells are arranged between a four-legged carrier frame and the just outlined components. The stirring mechanism is arranged on top of the supply container and reaches vertically into the supply container at the upper outer rim thereof to which the stirring mechanism is connected. The tiltable worm feeder is secured to the discharge opening of the supply container by a mounting hinge which permits only a limited lateral tilting within the framework itself. The worm feeder remains connected during the tilting with the discharge port of the supply container. Therefore, it is not possible to move the worm feeder completely away from the supply container. As a result, it remains difficult to gain complete access to the worm feeder so that maintenance and repair work is difficult to perform. In case it should become necessary to incorporate into the known apparatus additional components such as a second stirring mechanism or a double worm feeder instead of the single worm feeder, such incorporation would require a substantial mounting effort and expense.

An article entitled "Abfuellen, Dosieren, Mischen nach Gewicht" (Filling, Dosing, Mixing According to Weight), by H. Weinberg in the German Trade Magazine "Die Chemische Produktion" (The Chemical Production), May 1984, starting at page 36, provides general background information regarding such dosing devices and their use in industry.

Additional background information is provided by an article entitled "Entwicklungslinien der Schuettgutdosiertechnik" (Development Lines of the Bulk Material Dosing Technique), by G. Vetter et al. in the German Trade Magazine "Chem.-Ing.-Tech." Volume 62 (1990), No. 9, pages 695 to 706.

Both Trade Publications do not disclose any features regarding the present invention, except for general background information.

OBJECTS OF THE INVENTION

In view of the foregoing it is the aim of the invention to achieve the following objects singly or in combination:

to construct a dosing device for all sorts of bulk materials in such a way that its components are easily made accessible for maintenance and repair work;

to construct such a dosing device that components can be easily exchanged or different types of components may be combined in the same frame while minimizing the time needed for maintenance and repair work, and as for tooling and retooling operations; and to provide a system of modular components which are so constructed that one modular unit can easily replace any other modular unit of the same type within the system so that such system is well suited for refitting existing dosing equipment.

SUMMARY OF THE INVENTION

According to the invention the present dosing device is so constructed that the frame structure comprises at least one upright post which directly or indirectly supports the functional components of the device, and wherein at least one of these functional components is secured to the upright posts by a swivel arm with a journal for swiveling the one component horizontally into a lateral position outside the frame structure for an easy access to the component in its tilted out position.

It is an advantage of this construction according to the invention that maintenance and repair work on the individual functional components of the dosing device are easily performed while other functional components that do not require any attention at the moment can remain in their originally installed position. Thus, it is, for example, possible to replace a supply container in the system according to the invention, without removing a stirring component or the dosing component proper. If desired, any one of the components can be exchanged or replaced independently of any of the other components. All components are modular units.

According to the invention it is possible that the individual functional components of the dosing device or apparatus can be tilted horizontally into an operative position under the supply container and out again of that position without any removal of a fixed connection between the functional components, it is now possible to retool the present system during short down times. For example, it is now possible to incorporate into the system an additional stirring component into the dosing operation without any basic changes in the system. Further, different types of dosing or feeder components may be simultaneously provided in the system so that one or the other may be tilted into the operative position. While one component is being tilted out, the other component may already be tilted into the operative position, thereby minimizing the change over time.

The use of a frame that permits the journalling of the individual components to upright posts of the frame, has the additional advantage that the individual system can be adapted optimally to particular requirements by combining the functional components that are especially suitable for the particular purpose. Another advantage is seen in the universal exchangeability of the individual components. For example, the horizontally extending head section of the frame structure is so constructed that supply containers having different axial vertical heights, may be inserted into the head-section. By using an adapter collar, even supply containers with different diameters may be mounted in a centered position in or on the head section. Thus, the range of available supply container volumes is increased and it is now possible to select that supply container volume that is required for the particular type of bulk material and also with regard to the required dosing quantity.

Due to the fact that, according to the invention all operational components are axially aligned below the supply container in a vertical direction, and due to the further fact that according to the invention all components of the system are adjustable in their elevational position as well as tiltable out of the frame individually, it is now possible to install directly below the supply container, for example an intermediate component including a separate stirring device, an intermediate container, or a closure gate valve. These components can be constructed with due regard for the characteristics of the particular bulk material to be handled. Therefore, it is now possible to assemble an optimally effective stirring device with the required supply container and with the most advantageous dosing component including a differential dosing scale. Additionally, it is now possible to retool existing dosing devices in accordance with the teachings of the invention.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
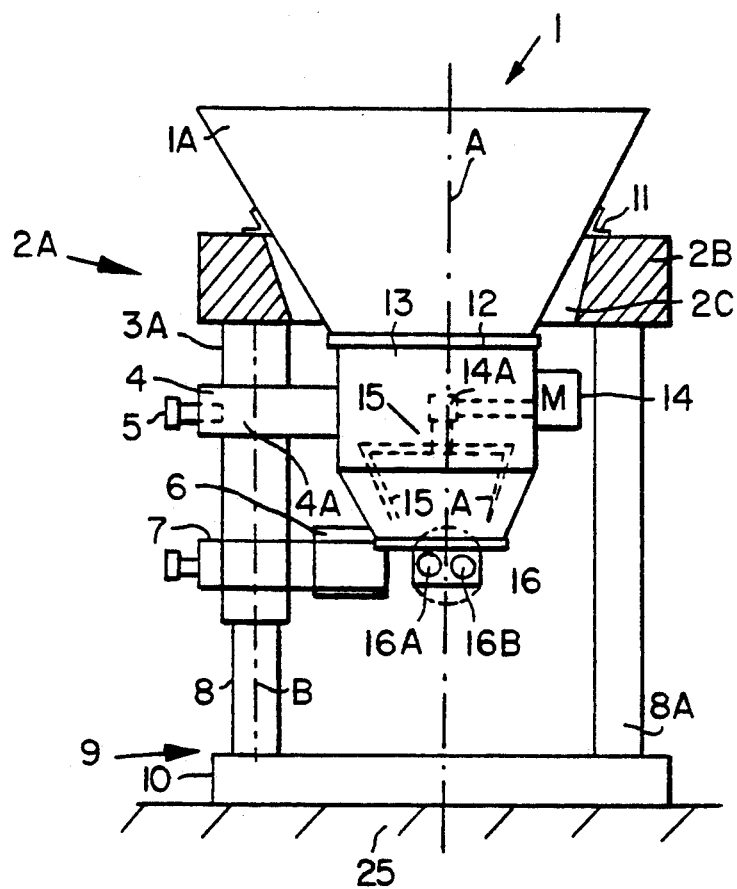
FIG. 1 is a side view of a first embodiment of a dosing device according to the invention which operates primarily as a feeder, but could be equipped with load cells to form a differential dosing scale.

FIG. 1 shows a first embodiment of a dosing system 1 according to the invention. The dosing system 1 has an axis A which may be a central axis, but need not necessarily be a central axis. This axis A provides the vertical reference line for the vertical alignment of the functional components of the system relative to one another. The system comprises a frame structure 2A also referred to as the tilting frame because the individual structural and functional components of the system are tiltable about at least one upright post of the frame structure. Although two upright posts 8 and 8A are shown in the figures, one post may be sufficient, or four posts may be used.

The dosing system 1 comprises a bulk material supply hopper 1A, a stirring container 13 vertically aligned below the hopper, and a double worm feeder 16 vertically aligned below the stirring container 13. A stirring mechanism 15 is centrally mounted in the stirring container 13. The stirring mechanism 15 comprises a stirring propeller with two wings 15A driven by a motor 14 through an angle gear box 14A. The motor 14 is mounted to the wall of the stirring container 13. The double worm feeder 16 comprises, for example, two feed worms 16A and 16B. A worm drive mechanism 6 is shown to the left of the worm feeder. Each of the three system components, namely the hopper 1A, the stirring container 13 with its stirring mechanism 15, and the double worm feeder 16 with its drive, is a separate structural component constructed as a modular unit so that one modular unit may be exchanged against a similar modular unit with different characteristics.

The vertical tilting frame 2A of the present system comprises, in addition to at least one upright post 8, a horizontal head section 2B provided with a conical central opening 2C in which the hopper 1A is received preferably in an adapter collar 11, whereby with the aid of different diameter collars, differently sized hoppers may be accommodated in the same conical central opening 2C. The head section 2B is supported on the upright post or posts 8, 8A which in turn are rigidly mounted on a bottom plate 10 forming together with the uprights 8, 8A a foot section 9 resting on the floor 25. At least one of the upright posts, for example, the post 8, forms a piston rod slidingly received in a cylinder mounting section 3A. The upper end of the cylinder section 3A is connected to the head section 2B, and is spaced from the bottom plate 10, but has a sufficient axial length for the attachment of the swivel mounting arms 4 and 7. The head section 2B together with the cylinder mounting section 3A, could be lifted slightly and then the entire head section could be tilted sideways around the central axis B of the upright post 8. This movement of the head section 2B with its cylinder section 3A in the axial direction, and around the axis B is possible, due to the sliding fit of the post 8 in the cylinder section 3A.

Referring further to FIG. 1, the supply container 1A has a funnel-shape and reaches through the opening 2C of the horizontal head section 2B. The above mentioned collar 11 is formed of angular sectional steel to adapt the same opening 2C to supply containers or hoppers of different diameters. The lower opening end of the supply hopper 1A has a flange 12 against which the intermediate stirring container 13 rests. The container 13 is mounted according to the invention to the swivel arm 4 that comprises a journal 4A surrounding the mounting cylinder section 3A. When a locking screw 5 is tightened, the arm 4 with the container 13 is rigidly held in the desired axially aligned position vertically below the hopper 1A. When the locking screw 5 is loosened, the entire unit with the container 13 and the stirring mechanism 15 can be tilted entirely out of the frame structure. Further, when the locking screw 5 is loosened, the arm 4 with its journal 4A can slide axially up or down on the mounting cylinder section 3A.

The next lower unit, namely the double worm feeder 16 with the double worms 16A and 16B and with the worm drive 6 is secured to the cylinder section 3A by a swivelling arm 7 also having a journal bore 7A therethrough to journal the arm 7 to the cylinder section 3A in the same manner as the swivelling arm 4. A further locking screw 5 functions in the same way as the screw 5 described above. Thus, when the locking screw 5 is loosened, the feeder 16 with its drive may be lowered out of its cooperation with the intermediate container 13 and swivelled out of the plane of the drawing into a position in front or in back of the plane of the drawing. In the shown position the stirring mechanism 15 is axially aligned with all the components relative to the axis A. Further, the stirring mechanism is located directly below the lower exit opening of the hopper 1A surrounded by the flange 12. The stirrer 15 has stirring wings 15A which are symmetrically arranged relative to the axis A.

The construction of the two swivelling arms 4 and 7 is identical for the above mentioned desirable exchange of components and for the horizontal tilting or swivelling of the respective system component out of the vertical alignment, and horizontally to one side or the other. However, it will be noted that the worm drive 6 is mounted to the swivelling arm 7, whereas the motor 14 for the stirring mechanism 15 is mounted to the intermediate or stirring container 13. In both instances the respective drives can be swivelled into a position outside of the frame structure for easy access and thereby facilitated maintenance work.

Instead of the double worm feeder 16, other feeding devices could be mounted to the swivelling arm 7. For example, a vibratory conveyor, or a single worm feeder, or dosing spirals could be used for the feeding of the bulk material. Even a belt conveyor could be secured to the swivel arm. If the dosing system is intended for handling bulk materials not requiring any stirring mechanism, the respective unit or component could be replaced by an intermediate container or the dosing feeder could be mounted to cooperate directly with the hopper 1A.

Where an intermediate container is used, the latter could be equipped with guide means for the bulk material to improve the uniformity of the dosing operation and to increase the available volume for holding bulk material. This purpose could also be achieved by using a larger volume hopper which may require a different adapter collar 11 and which may have a larger axial height. The adapter collar 11 will make sure that the different supply hoppers 1A will be held at the proper level to avoid a need for readjusting the position of the units 13 and 16.

Figure 2:
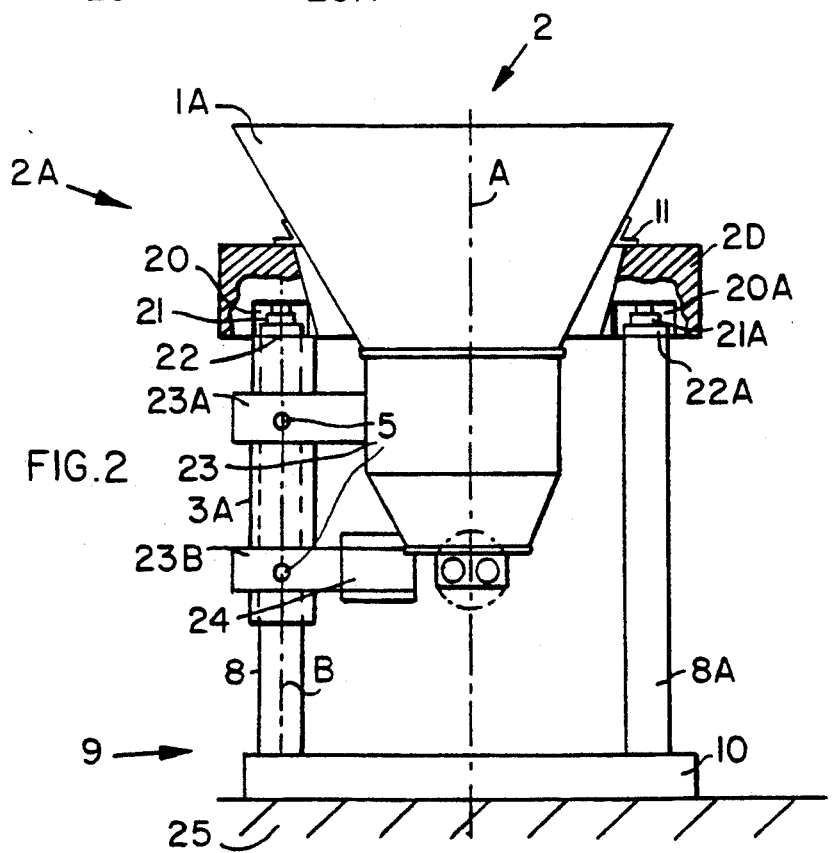
FIG. 2 is a view similar to that of FIG. 1, and showing the position of weighing load cells for the differential dosing scale.

FIG. 2 illustrates a second embodiment of a dosing system 2 according to the invention. The system 2 comprises a frame structure 2A which is substantially the same as the frame structure of FIG. 1, except that a differential dosing scale is incorporated in the system 2. For this purpose the head section 2D is provided with bores 20 and 20A in which load cells 21 and 21A are received between the head section 2D and the top of the respective post. Thus, the load cell 21 is arranged between the top 22 of the post 8 and the head section 2D while the load cell 21A is received between the head section 2D and the top 22A of the post 8A. The mounting cylinder section 3A functions in the same way as described above with reference to FIG. 1. The interconnection of the load cells in respective bridge circuits is well known in the art and hence not described.

A dosing device 24 with its respective drive, is mounted to a swivel arm 23B while an intermediate container 23 is mounted to a swivel arm 23A.

The above mentioned differential dosing scale comprises at least two identical load cells 21 and 21A, one in each of said bores 20 and 20A, whereby the diameter of the bores is larger than the outer diameter of the upright posts 8, 8A to avoid a direct contact between the posts and head section 2D so that the latter is exclusively supported through the load cells 21 and 21A for accurate weighing.

The cylinder section 3A is rigidly connected to the head section 2D as in FIG. 1, thereby forming a structural unit. The upright post 8 is slidingly received in the cylinder section 3A also as in FIG. 1. Preferably, the inner diameter of the cylinder section 3A is slightly larger than the outer diameter of the post 8 so that there is no direct force transmitting connection between the cylinder section 3A and the post 8. This construction makes sure that all components of the system, except the upright posts 8, 8A and the bottom plate 10 are included in the weight value. Such inclusion is acceptable because the scale functions as a differential weighing scale, whereby any exchange of functional components 1A, 23, 24 having different weights, does not have any influence on the ascertained weight value of bulk material passing through the system.

Figure 3:
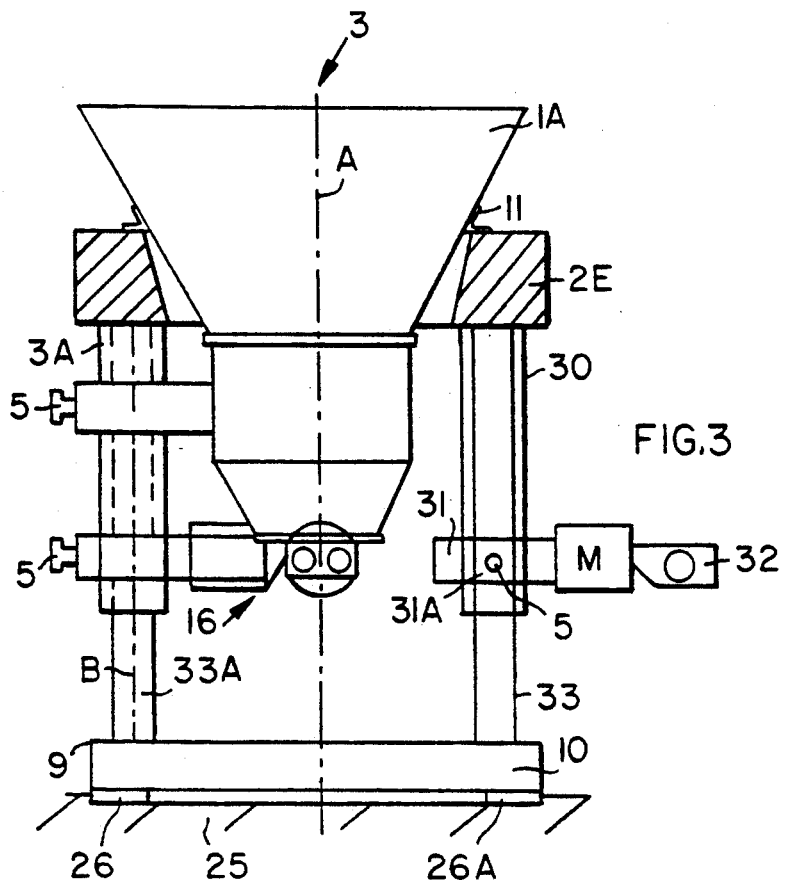
FIG. 3 shows a further modification with load cells weighing the entire apparatus and with components journalled to two different upright posts.

FIG. 3 illustrates a third embodiment of a dosing system 3 according to the invention in which two mounting cylinder sections 3A and 30 are rigidly secured to a head section 2A. Upright posts 33 and 33A are slidingly received in the respective cylinder sections 30 and 3A. In addition to the swivel mounting already described above, a further swivel arm 31 with its journal 31A is secured to the mounting cylinder section 30 so that either the left-hand dosing unit 16 with its drive and its double worm feeder, or the right-hand feeder unit or dosing device 32 with its drive may be tilted into an operative position in vertical alignment with the axis A. Both cylinder sections 3A and 30 may carry several system components or units. The arrangement of exchange units as shown in FIG. 3 on two mounting cylinders is especially suitable for a rapid exchange of components. The dosing device 32 comprises only one feed worm. Any type of system component may be secured to any of the two cylinder mounting sections.

FIG. 3 further shows that load cells 26 and 26A are arranged between the floor 25 and the bottom frame plate 10 so that the entire system is being weighed. In systems in which the entire system is included in the weight of the differential dosing scale, it is possible to omit the mounting cylinder sections 3A and 30 altogether, and to secure the respective system components directly to the upright posts 33, 33A by respective journals and locking screws 5. However, the use of mounting cylinder sections 30, 3A permits the easy disassembly of the head section 2E from the foot section 9.

The dosing devices described above with reference to the three systems 1, 2, and 3, can be equipped for a gravimetric weight measuring, for a volumetric measuring, or for a measuring of a volume or weight per unit of time.

The three described systems are also basically suitable for dosing liquids and paste type bulk materials. In all instances respective supply containers, intermediate containers, stirring mechanisms, and dosing components are required. Any of these components will be mounted on the swivel arms according to the invention. The dosing devices in those instances where the system is equipped for liquid or paste type materials, will comprise pumps and respective drive motors for discharging the liquid or paste bulk materials through nozzles into conveyances or mixers for further use.

Although the invention has been described with reference to specific example embodiments it will be appreciated that it is intended to cover all modifications and equivalents within the scope of the appended claims.

What we claim is:

1. A dosing device for bulk materials including liquids, comprising a frame structure having a vertical frame axis and including a head section and upright post means supporting said head section, a supply container supported by said head section in alignment with said vertical frame axis, dosing means (1, 13, 16, 23, 32) for dosing said materials, swivel mounting means for mounting said dosing means in said frame structure, said swivel mounting means including journal means for journalling said swivel mounting means to at least one of said upright post means, said dosing means and said swivel mounting means being so dimensioned that a central axis of said dosing means coincides with said vertical frame axis when said dosing means are in an operative position below said supply container, and wherein said journal means permit horizontally swivelling said dosing means out of said frame structure for providing easy access to said dosing means.

2. The dosing device of claim 1, wherein said head section comprises at least one horizontally extending frame member for supporting said supply container, wherein said upright post means comprise at least one vertical post supporting said horizontal frame member, said at least one vertical post forming a vertical journal shaft for said journal means for swivelling at least one of said dosing means horizontally out of alignment with said vertical frame axis.

3. The dosing device of claim 1, wherein said upright post means comprise at least one upright post including a vertical piston rod and a vertical cylinder section in which said piston rod is slidingly received, said head section comprising at least one horizontal member secured to one of said cylinder section and piston rod, and wherein said swivel mounting means mount at least one of said dosing means to one of said cylinder section and piston rod.

4. The dosing device of claim 3, wherein said piston rod forms a lower piston portion of said upright post means, wherein said vertical cylinder section forms an upper cylinder portion of said upright post means, whereby said upper cylinder portion is axially movable relative to said lower piston portion, and wherein said swivel mounting means journal at least one of said dosing means to said upper cylinder portion for swivelling said at least one dosing means out of alignment with said vertical frame axis.

5. The dosing device of claim 4, wherein said at least one horizontal member is secured to said upper cylinder portion which is also rotatable about a vertical post axis (B).

6. The dosing device of claim 1, wherein said dosing means comprise, in addition to said supply container, an intermediate container below said supply container and feeder means below said intermediate container, said swivel mounting means comprising a first swivel arm for said intermediate container and a second swivel arm for said feeder means, each swivel arm comprising its own journal secured to said upright post means.

7. The dosing device of claim 1, further comprising releasable locking means (5) for securing said journal means to said upright post means against rotational movement around said upright post means and against axial movement along said upright post means, whereby said swivel mounting means are axially and rotatably movable relative to said upright post means when said locking means are released.

8. The dosing device of claim 1, wherein said dosing means comprise load cell means between said head section and said upright post means, said load cell means forming a differential dosing scale for weighing bulk material passing through said supply container.

9. The dosing device of claim 8, wherein said load cell means form the only means for transmitting a vertical force component from said head section to said upright post means.

10. The dosing device of claim 1, wherein said dosing means comprise load cell means arranged between a floor and said upright post means for forming a differential dosing scale for weighing bulk material passing through said dosing device.

11. The dosing device of claim 1, wherein said upright post means comprise at least two upright posts supporting said head section, and wherein said journal means of said swivel mounting means are mountable to any one of said two upright posts.

12. The dosing device of claim 11, wherein at least one of said two upright posts includes a vertical piston rod and a vertical cylinder section in which said piston rod is slidingly received.

* * * * *